(12) United States Patent
Degroot

(10) Patent No.: US 8,366,997 B2
(45) Date of Patent: *Feb. 5, 2013

(54) MODULAR LABORATORY AUTOMATION SYSTEM

(75) Inventor: Richard James Degroot, Southfield, MI (US)

(73) Assignee: Shoto Technologies LLC, Bayonne, NJ (US)

( * ) Notice: Subject to any disclaimer, the term of this patent is extended or adjusted under 35 U.S.C. 154(b) by 718 days.

This patent is subject to a terminal disclaimer.

(21) Appl. No.: 12/453,726

(22) Filed: May 20, 2009

(65) Prior Publication Data

US 2010/0202924 A1     Aug. 12, 2010

Related U.S. Application Data

(60) Provisional application No. 61/202,250, filed on Feb. 10, 2009.

(51) Int. Cl.
   *G01N 27/00*     (2006.01)
   *G01N 35/00*     (2006.01)
(52) U.S. Cl. ............ 422/50; 422/98; 422/509; 422/518; 436/43; 436/55; 436/149; 363/142; 307/153
(58) Field of Classification Search .................. 422/105, 422/130, 129, 50, 98, 509, 518; 600/300; 436/43, 55, 149; 363/142; 307/153
   See application file for complete search history.

(56) References Cited

U.S. PATENT DOCUMENTS

| | | | |
|---|---|---|---|
| 2,949,273 A | 8/1960 | Roper et al. | |
| 4,471,898 A | 9/1984 | Parker | |
| 4,585,519 A | 4/1986 | Jaffe et al. | |
| 5,231,564 A | 7/1993 | Pellegrino | |
| 5,576,941 A | 11/1996 | Nguyen et al. | |
| 5,917,719 A | 6/1999 | Hoffman et al. | |
| 6,943,531 B2 | 9/2005 | Fukaya | |
| 7,275,967 B1 | 10/2007 | Olliff | |
| 2004/0124711 A1 | 7/2004 | Muchow et al. | |
| 2004/0149690 A1 | 8/2004 | Hsieh et al. | |
| 2007/0158945 A1 | 7/2007 | Annen et al. | |
| 2007/0219430 A1 | 9/2007 | Moore | |
| 2008/0069739 A1* | 3/2008 | Ludwig .................. | 422/130 |
| 2008/0151581 A1 | 6/2008 | Lanni | |

FOREIGN PATENT DOCUMENTS

| | | |
|---|---|---|
| DE | 199 63 799 | 7/2001 |
| EP | 0353489 | 2/1990 |
| EP | 0612861 | 8/1994 |
| FR | 02536539 | 5/1984 |
| JP | 59-192963 | 11/1984 |
| WO | WO 8706008 | 10/1987 |

OTHER PUBLICATIONS

International Search Report for PCT/US2010/23040 dated Mar. 31, 2010.
Written Opinion for PCT/US2010/23040 dated Mar. 31, 2010.

(Continued)

*Primary Examiner* — Lyle Alexander
(74) *Attorney, Agent, or Firm* — Oliff & Berridge, PLC

(57) ABSTRACT

A modular laboratory automation system for monitoring and controlling laboratory experiments, the modular laboratory automation system including a controller, an interface board, and a portable power supply. Power levels of standard laboratory equipment can be automatically controlled, and conditions and parameters of experiments can be automatically monitored and recorded. The laboratory automation system is modular and can be configured to operate with laboratory experiments having varying setups and equipment.

21 Claims, 3 Drawing Sheets

OTHER PUBLICATIONS

International Search Report for PCT/US2010/023057 dated Apr. 8, 2010.
Written Opinion for PCT/US2010/023057 dated Apr. 8, 2010.
Office Action issued in U.S. Appl No. 12/453,725; mailed Sep. 8, 2011.
International Preliminary Report on Patentability issued in International U.S. Appl. No. PCT/US2010/023057; mailed Aug. 16, 2011.
International Preliminary Report on Patentability issued in International U.S. Appl. No. PCT/US2010023040; mailed Aug. 16, 2011.

* cited by examiner

MODULAR LABORATORY AUTOMATION SYSTEM

CROSS-REFERENCE TO RELATED APPLICATION

The present application claims priority to U.S. Provisional Patent Application No. 61/202,250, which was filed on Feb. 10, 2009, the disclosure of which is incorporated herein by reference in its entirety. The application entitled "Portable Power Supply for Laboratory Equipment" (application Ser. No. 12/453,725, published as U.S. Patent Application Publication No. 20100202171;), now U.S. Pat. No. 8,154,899, that is being filed concurrently herewith, is additionally incorporated herein by reference in its entirety.

BACKGROUND

This disclosure relates generally to a control system for experimental setups in laboratories, and more particularly to a modular system that can monitor and automatically change the power levels of various laboratory equipment to aid an operator in experimentation. The system can cooperate with laboratory equipment, such as heaters, coolers, pumps, stirrers, etc. The system can automatically record the power levels as well as other physical parameters and variables of the experimental setup, such as time, temperature, pressure, weight, etc.

Experimental setups in laboratories are geared toward determining the effect of variables on a parameter of the experiment. This can be accomplished by adjusting experimental variables, recording the effects of changes, and analyzing whether the changes are beneficial or detrimental. In a chemical lab, for example, various devices such as stirrers, pumps, motors, and heaters are responsible for different experimental variables. Each of these devices has its own power supply and control system. In many laboratory devices, such as magnetic stirrers and heaters, an operator controls device parameters by turning a knob that is integral to the device. Experiments are typically monitored by manually recording variables in a laboratory notebook where experimental variables are noted at predetermined time intervals.

Control of industrial processes, such as chemical processes, has been largely automated by using data acquisition systems that are hardwired into control panels. This control equipment is usually custom-designed for each process and is physically integrated into the process equipment. Desktop computers equipped with software can be incorporated into industrial control systems to control and monitor the equipment used to operate the process.

SUMMARY

Automated control systems used in industrial processes tend to be complicated, bulky, inflexible, and expensive. For example, in industrial process control, data acquisition monitoring signals are collected through wires to electrical boxes, and incorporate conduits, cables, wires, DIN rails, signal conditions, power supplies, amplifiers, etc. Automated industrial control systems are also inflexible because they are typically designed to operate with only one process and are not portable. Such systems are impractical for laboratory use where experimental setups must be frequently changed and adapted.

In laboratory setups, the use of multiple devices enables flexible design of experiments because each device can be used in a variety of experiments. For example, a heating element can be used to conduct a distillation experiment one day, and a solubility experiment on the next day. Each of the multiple devices that commonly make up laboratory setups has its own controller that takes up space, has capital costs, and requires individual monitoring and operation. In this regard, the need for the scientist to observe and record experimental parameters in a notebook at predetermined time intervals can be tedious, particularly when the experiment has many variables that must be recorded in short periods of time. Similarly, in order to vary an experimental parameter of a laboratory device, the scientist must manually adjust the control on the device.

Aspects of this disclosure can facilitate the scientist or technician in performing laboratory work. In particular, automatic control and recordation of laboratory experiments enables experimental data and parameters to be automatically recorded in databases or spreadsheets for subsequent access and analysis. The system can also automatically make needed changes to power levels to electrical devices to maintain experimental parameters and also record the changes for future reference in the form of a spreadsheet or database.

The use of one power supply and one power controller for many laboratory devices reduces capital costs of laboratory experiments and reduces clutter on the laboratory work bench. For example, most laboratory sensors require a sold-separately monitor-controller, which is usually expensive. In one respect, the present disclosure provides an automation system that obviates the need for a separate monitor/controller and power supply for each laboratory device. For example, multiple laboratory sensors can be monitored by the computer, and multiple laboratory devices can be powered from the system's single portable power supply.

According to one aspect of the present disclosure there is provided a modular laboratory automation system for use with laboratory devices, where the system includes a controller that outputs initial control signals relating to the laboratory devices, an interface board that receives the initial control signals and outputs voltage control signals based on the initial control signals, where the interface board also receives monitoring signals from the laboratory devices and outputs the monitoring signals to the controller, and a portable power supply that includes a power terminal electrically connectable to a laboratory device. The portable power supply can receive the voltage control signals and output power to the laboratory device through the power terminal, where the outputted power is based on the voltage control signals.

According to another aspect of the present disclosure there is provided a modular laboratory automation system for use with laboratory devices, where the system includes a controller that outputs initial control signals relating to the laboratory devices, an interface board that receives the initial control signals and outputs voltage control signals based on the initial control signals, where the interface board also receives monitoring signals from the laboratory devices and outputs the monitoring signals to the controller, and a portable power supply that includes at least one 120V or 240V power receptacle, and at least one of a DC power terminal, a DC variable power terminal incorporating operational amplifiers, and a potentiometer terminal configured to incorporate a circuit that replaces a laboratory device potentiometer. Each power terminal is electrically connectable to a laboratory device. The power supply can receive the voltage control signals and output power to the laboratory device through each power terminal, where the outputted power is based on the voltage control signals.

BRIEF DESCRIPTION OF THE DRAWINGS

Exemplary embodiments are described in detail below with reference to the accompanying drawings in which.

DETAILED DESCRIPTION

Exemplary embodiments of the broad principles outlined herein are described with reference to the various drawings.

The modular laboratory automation system according to the present disclosure provides, in some aspects, a convenient and economical device for controlling, monitoring, and recording a variety of experimental setups that use widely available laboratory equipment. The modular system is configured to operate with a wide variety of standard laboratory equipment, and accordingly is flexible enough to provide automated control and monitoring for most laboratory experiments. In this manner, the laboratory automation system is modular and can be used with different experimental setups as the experimental requirements of the laboratory change.

Figure 1:
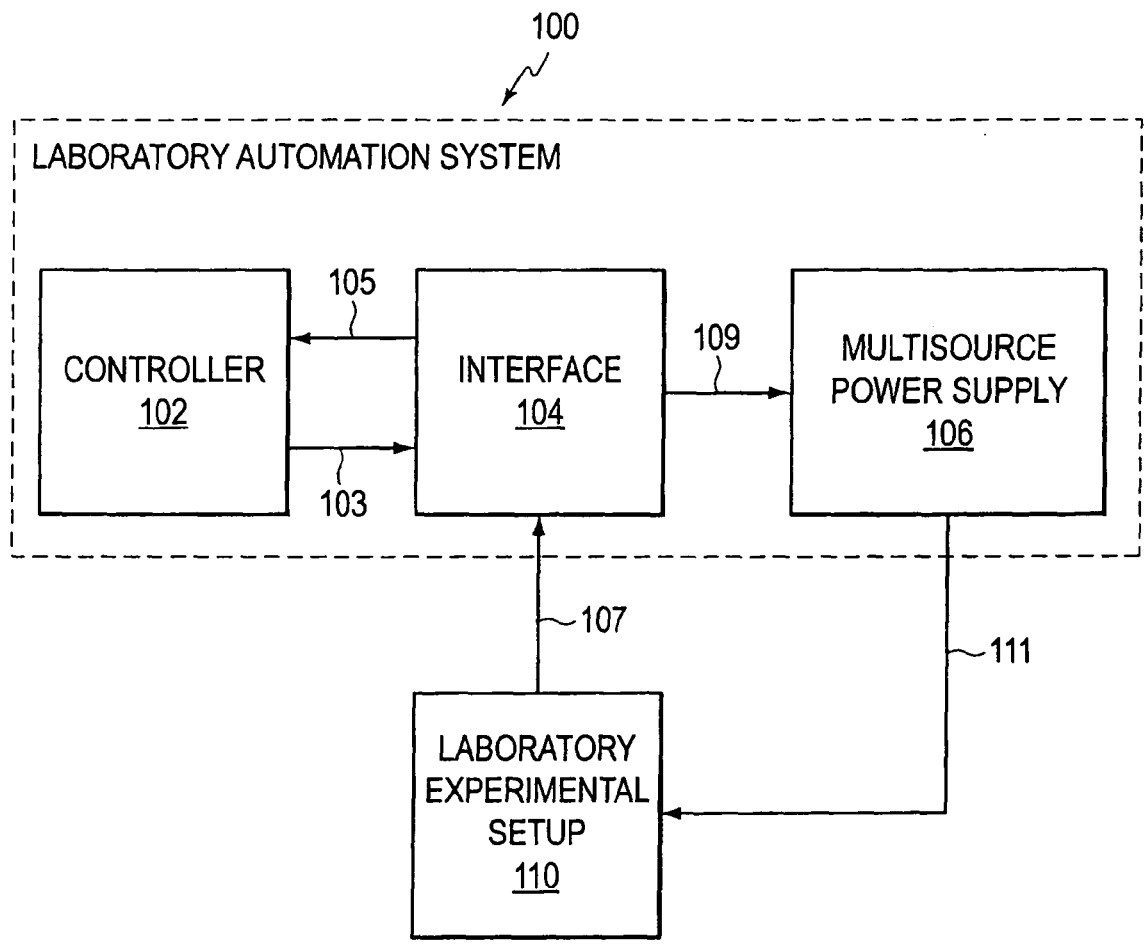
FIG. 1 is a block diagram of an exemplary modular laboratory automation system.

FIG. 1 shows a block diagram of an exemplary modular laboratory automation system 100. The laboratory automation system can include a controller 102, an interface 104, and a power supply 106. The modular laboratory automation system 100 is configured to control and monitor laboratory equipment in laboratory experimental setup 110.

The controller 102 is configured to communicate with the interface 104. Specifically, the controller 102 is configured to send initial control signals 103 to the interface 104, and to receive monitoring signals 105 from interface 104.

The interface 104 receives initial control signals 103 from controller 102 and receives monitoring signals 107 from laboratory equipment in laboratory experimental setup 110. The interface 104 sends monitoring signals 105 to controller 102. The interface 104 outputs voltage control signals 109 to the power supply 106. Optionally, the interface 104 can also send voltage control signals directly to equipment included in laboratory experimental setup 110.

The power supply 106 receives voltage control signals 109 from interface 104, and outputs power supply 111 to equipment in laboratory experimental setup 110.

The controller 102 can include a computer processor that runs software enabling control and monitoring of various parameters of experimental setup 110 and corresponding laboratory equipment. For example, the controller can change the power settings of an individual laboratory device through the analysis of input parameters. The controller can maintain or adjust equipment parameters and experimental variables using control mechanisms known in the art, such as proportional-integral-derivative (PID) control. The controller can be configured to automatically monitor and record experimental variables, and to allow an operator to automatically change setpoints of equipment in laboratory experimental setup 110. For example the controller can allow an operator to specify the power level supplied to a laboratory device through the software, turn a laboratory device on and off through the software, or allow an operator to set predetermined time intervals when a laboratory device will be turned on and off. The controller can also permit an operator to set experimental conditions at which a laboratory device will be turned on or off. The controller can be configured to run software that records experimental data in the form of databases or spreadsheets, for example, which allows an operator to access and analyze recorded data. The controller can include either a desktop or laptop type computer, and preferably includes a laptop computer to maximize the portability of the system.

The interface 104 communicates with controller 102 through, e.g., USB ports, Ethernet ports, serial ports, parallel ports, or any other suitable communication mode. The interface 104 outputs low voltage (e.g., 0-5V or 0-4V) control signals 109 to the power supply 106, which are received in corresponding terminals at the power supply 106. The interface 104 is configured to receive monitoring signals 107 from laboratory equipment in laboratory experimental setup 110 at a plurality of analog/digital input channels and/or thermocouple channels.

The power supply 106 serves to convert the low voltage control signals 109 from the interface 104 into necessary voltages and amperages for laboratory equipment. The power supply 106 includes all of the needed relays and/or printed circuit boards, power supplies, and signal conditioners required by the interface. The power supply 106 can be powered by a 120V or 240V power source, which enables the power supply to be powered by any standard wall outlet, thereby enhancing the portability of the power supply 106. The power supply 106 further includes a plurality of power terminals that are electrically connectable to laboratory equipment in experimental setup 110. The plurality of terminals can include one or multiple (e.g., up to five) of each of: 120V or 240V receptacles, DC variable terminals incorporating operational amplifiers, DC power terminals, and potentiometer terminals configured to replace control knobs on laboratory devices. The power terminals facilitate control of various laboratory equipment in laboratory experimental setup 110. The built-in power outlets in the power supply 106 obviate the need for the scientist to hardwire power to laboratory electronic equipment to a power supply, as is done in the case of industrial automation systems.

The laboratory automation system 100 should be configured to be modular. The modularity of the laboratory automation system enables it to be used with any number of different experimental setups and to operate with different laboratory equipment. In this manner, the modular laboratory automation system can be used to control and monitor a fractional distillation experiment, a pressure reaction experiment, and a solubility experiment, for example. Thus, the modular system provides flexibility because numerous laboratory devices can be monitored and controlled with the same system.

In some embodiments, the power supply 106 can be a multisource power supply including a plurality of terminals that are configured to control power to laboratory devices with different power requirements. Similarly, the interface board, which inputs monitoring signals from laboratory devices, can include terminals enabling its use with a number of different laboratory devices.

In another aspect, the laboratory automation system 100 of the present disclosure can be configured and sized to be portable. Portability of the system enables an operator to move the system to different experimental setups located in the laboratory. Accordingly, the computer, interface board, and power supply can each be configured and sized to be portable. Typically, the computer, interface board and power supply have a total volume of less than about one cubic foot. Of these components, the power supply typically occupies the largest volume, and can have a volume of less than one cubic foot. Additionally, any power requirements of the computer, interface board, and power supply can be supplied by standard 120V/240V electrical wall outlets, so that an operator may readily transport the system to different experimental setups throughout the laboratory as need requires. In this regard, the laboratory automation system is substantially self-contained in that typically only a computer and the power supply need to be plugged into wall jacks. The small size and self-contained character of the laboratory automation system facilitates its portability and renders it convenient to use with different laboratory experimental setups.

The laboratory experimental setup 110 in FIG. 1 represents any laboratory experimental setup that includes multiple laboratory devices, including sensors that monitor experimental variables. Laboratory devices are controlled and/or monitored by the modular laboratory automation system 100. The laboratory devices can include, for example, heaters, chillers, coolers, pumps, valves, stirrers, thermocouples, pressure transducers, load cells, flow meters, rotovaps, etc. The system can automatically record the power levels supplied to each device as well as other physical parameters of the experiment.

Specific embodiments illustrating an interface and power supply of the modular laboratory automation system are described in greater detail with reference to FIGS. 2 and 3.

Figure 2:
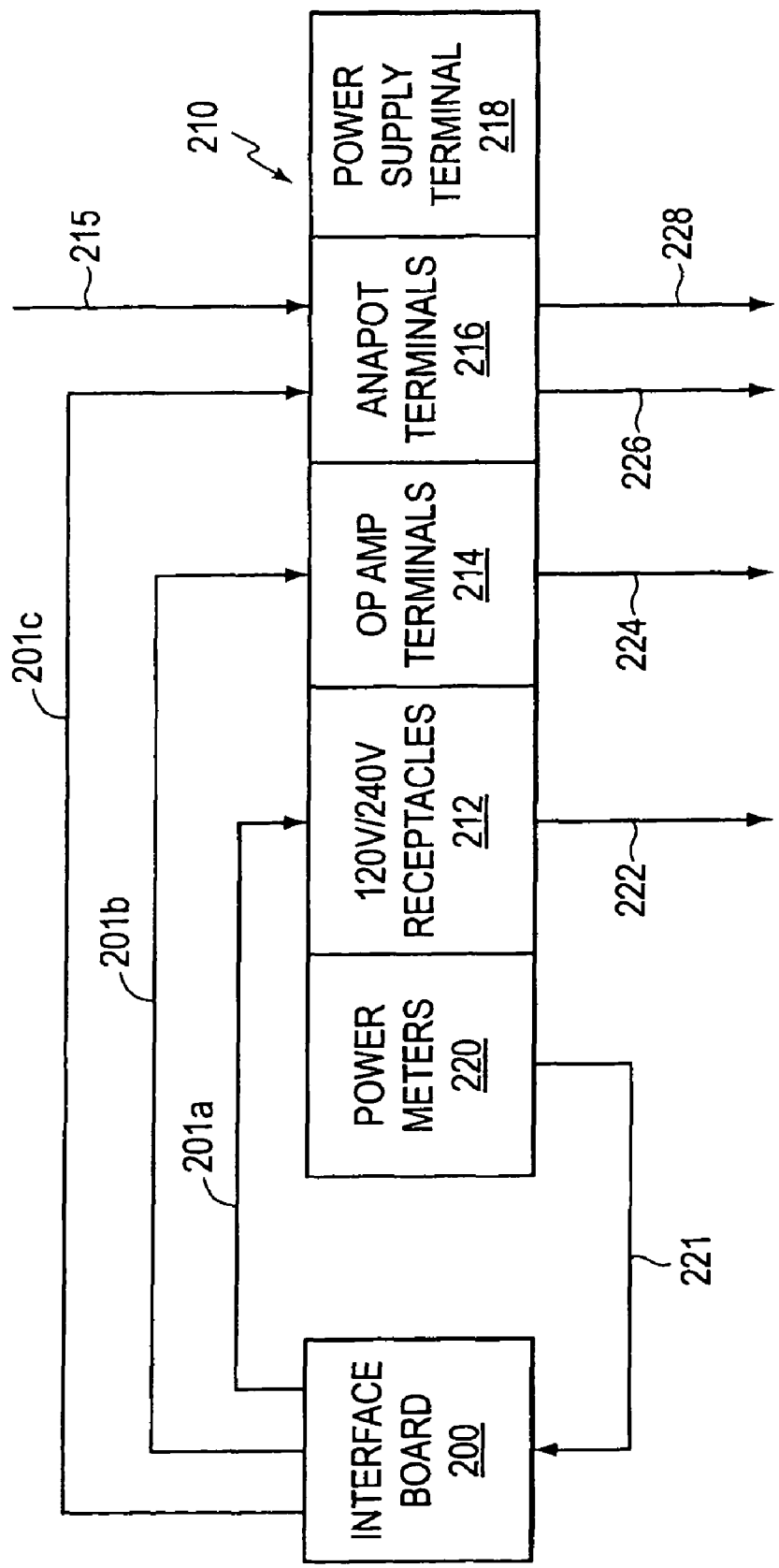
FIG. 2 is a schematic diagram illustrating the configuration of an interface and a power supply in an exemplary modular laboratory automation system.
Figure 3:
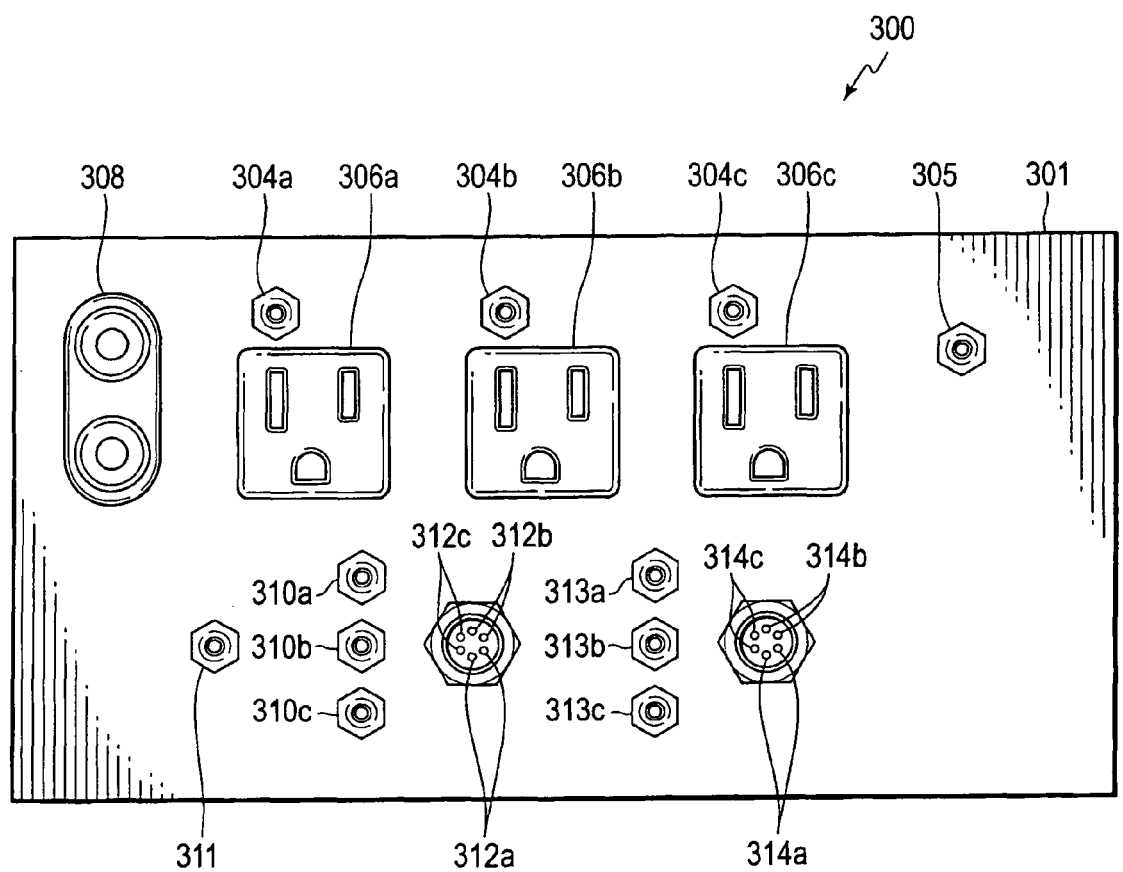
FIG. 3 illustrates a front-view of an exemplary multisource power supply.

FIG. 2 is a schematic diagram illustrating operation of interface board 200 and multisource power supply 210 according to one aspect of the present disclosure.

Interface board 200 sends low voltage (e.g., 0-5V or 0-4V) analog and digital output signals 201 to multisource power supply 210, which are received on corresponding input terminals. The interface board can utilize USB-driven modular data acquisition boards, which are commercially available. The interface board 200 can optionally include channels that output voltage control signals directly to various laboratory equipment. The interface board 200 can also be configured to include analog or digital input channels that receive monitoring signals from the laboratory equipment. The interface board can also be configured with channels that receive 4-20 mAmp signals from laboratory equipment such as, for example, flow meters.

The multisource power supply 210 includes 120V/240V receptacles 212, operational amplifier ("op amp") terminals 214, "Anapot" terminals 216, and 15V power terminal 218. The power supply can optionally include power meters 220.

The power supply 210 can be powered by a 120V or 240V power source 215, which can be plugged into a standard wall outlet.

The 120V/240V receptacles 212 can be used to power any laboratory equipment having a standard wall plug. The power supply converts low voltage digital signals 201a into power supply 222 that controls power to laboratory devices that are plugged into receptacles 212. In this manner, the software can control laboratory devices to be "on" and "off" and control the power supply to those devices.

The op amp terminals 214 can be used to convert low voltage analog signals 201b from the interface board into power supply 224, to power devices that use 0-15V and up to 1 Amp or more power. The op amp circuits are useful to control laboratory devices that have a control coil, e.g., proportional control valves and solenoids.

The "Anapot" terminals 216, which are also referred to in this disclosure as potentiometer terminals, can be used to control laboratory devices having standard control knobs (i.e., potentiometers or "control pots"), as are common on, for example, magnetic stirrers. The "Anapot" circuits in the power supply 210 convert the low voltage (e.g., 0-4V DC) analog signals 201c from the interface board into a voltage signal to replace a control knob. A two wire adaptor can be used for this conversion. One wire 228 is attached to the "Anapot" circuit and the high voltage side of the control pot. The second 226 wire is also connected to the "Anapot" circuit and then to the wiper terminal of the control pot. Variations in the 0-4V analog control signal voltage are used to control the "Anapot" circuit and adjust the voltage to the wiper, in effect, replacing the control pot of the device. Thus, the controller can effectively control the knob of the device by varying the voltage of the analog control signal.

The power meters 220 are coupled to the 120V/240V receptacles 212 and measure the power usage of those outlets. The power meters 220 send a monitoring signal 221 to interface board 200, which is received at corresponding dedicated terminals on interface board 200. The power meters are useful for determining energy requirements for different experiments, and for determining when power requirements of an experimental setup change.

Operation of a multisource power supply according to another embodiment is described in detail with reference to FIG. 3. FIG. 3 is a front-view of an exemplary multisource power supply 300 that can be used as part of the modular laboratory automation system. The power supply 300 includes a housing 301 that accommodates a 120V power chord in the rear of the housing (not shown) that can be plugged into standard household line voltage, three 120V AC receptacles 306a, 306b, 306c, three digital inputs 304a, 304b, 304c corresponding to the 120V AC receptacles, one 15V DC power terminal 308, three op amp terminals 312a, 312b, 312c, three analog inputs 310a, 310b, 310c corresponding to the op amp terminals, three "Anapot" terminals 314a, 314b, 314c, and three analog inputs 313a, 313b, 313c corresponding to the "Anapot" terminals. The power supply 300 also includes a digital ground 305, and an analog ground 311.

As in the above embodiments, the 120V power source is the standard line voltage supplied by electrical outlets that enables the power supply 300 to be plugged into a wall outlet.

Digital inputs 304 receive the voltage control signals from the interface board and control power supply to receptacles 306. Typically, the low voltage signals received at the digital inputs 304 are in the range of 3-5 V DC. The digital inputs 304 comprise two insulated terminal screws. One screw is electrically connected to ground 305, and the other to terminal 304. The terminal screws allow the low voltage control signals from the interface board to be converted into output voltages by using solid state relays. Thus, for example, a 5V input can correspond to a 120V output that is supplied to the laboratory equipment that is plugged into receptacles 306.

Laboratory devices can be plugged into the 120V receptacles 306 to control power supply to the laboratory devices. In one aspect, a laboratory device that is plugged into an receptacle 306 can turned on or off by inputting into the computer the desired power level that corresponds to the particular receptacle. For example, heat from a heating mantle can be controlled by specifying the required power level of the mantle from the computer. Alternatively, laboratory equipment can be controlled by specifying a variable on the computer, and a PID controller can be used to control the power to the receptacle to maintain the variable as constant. Thus, for a heating mantle, an operator can select a desired temperature, and the computer can use a PID loop to control the power supply of the receptacle 306 to maintain a constant temperature based on temperature input from a thermocouple.

The multisource power supply 300 can also include power meter circuitry that are associated with each receptacle 306, and output power level information of receptacles 306 to analog input terminals or dedicated terminals on the interface board. The power meters can monitor the power to each 120V receptacle 306 independently. The power meters can be useful to analyze the thermodynamic properties of experiments, and to determine when the conditions of an experiment change.

The 15V DC power terminal 308 on multisource power supply 300 can provide power needed to monitor sensors and meters that require an "excitation voltage." Exemplary devices that can be powered with the 15V DC power terminal 308 include load cells and pressure transducers. The 15V DC power terminal 308 can also supply the power that is needed for devices such as flow meters and on/off control valves. In addition to, or in place of, the 15V power terminal 308, DC power terminals with voltages ranging from 0-36V or 0-16V can be used depending on the requirements of the laboratory equipment. Terminals having about 5V, 12V, 15V and 16V outputs are useful for common laboratory equipment. Power supply for equipment with low voltage requirements (0-4V or 0-5V) can also be supplied directly from the interface board.

The multisource power supply 306 receives low voltage signals from the interface board at op amp input terminals 310a, 310b, 310c, and converts the low voltage signals into power signals that are supplied to laboratory devices through corresponding op amp output terminals 312a, 312b, 312c. Each output 312a, 312b, 312c of the op amp circuit consists of two output wires (a high voltage side and a low voltage side). The op amp circuit also includes an analog ground terminal 311. The op amp circuits are used to power laboratory devices that use 0-15V and up to 1 amp or more power. For example, the op amp terminals are useful to power proportional control valves, or other devices that are controlled with a magnetic-type coil.

The "Anapot" terminals 314 can be used to by-pass or replace the control knobs of laboratory devices. In particular, wires from the "Anapot" terminal are connected to the electrical leads of control pot on the knob controller of a laboratory device. Two wires from the "Anapot" terminal are connected to the control pot; one wire is connected to the hot leg of the knob on a particular device, and the other wire is connected to the wiper wire. Two wires from the 0-4V DC signal from the interface board are connected to terminals 313a, 313b, or 313c, the control side of the "Anapot" circuit. The 0-4V DC will supply a proportional amount of current to the "Anapot" circuit of the device. The higher the 0-4V DC voltage, the more current will be supplied to the wiper terminal of the pot. This has the same effect as turning the knob. For example, 0V can correspond to an "off" position of the knob, while 4V can correspond to a knob position of 100% on. An input from the laboratory device can also be sent to the interface board, and can be used to control the voltage to the "Anapot" circuit and correspondingly to the device. For example, an rpm sensor on a stir motor can be sent to the interface board, and can be used to control the 0-4V DC control voltage to maintain a constant stirring speed. Devices that can be monitored/controlled by use of the "Anapot" terminals include the speed of a magnetic stirrer or mechanical stirrer, recirculation bath, pump, and the like.

The housing 301 of power supply 300 contains the necessary electronics and circuitry to receive analog and/or digital control voltages, the necessary electronics and circuitry to provide regulated DC power required by some laboratory equipment, and fuses, PCBs or relays that can protect the equipment and operator from overloads. In some embodiments, the power supply 300 can use multiple solid state relays.

Operation of a modular laboratory automation system according to one embodiment of the present invention can be illustrated by description of a pressure reaction in an autoclave. In this experimental setup, the laboratory automation system monitors and controls pressure, temperature, stir rate, and reagent addition and removal.

In this embodiment, the interface board contains one or more of a plurality of thermocouple connections, a plurality of analog input connections, a plurality of digital input connections, a plurality of analog output connections and/or a plurality of digital output connections. In the pressure reaction experiment, thermocouples monitor the temperature of the reaction. Outputs from the thermocouple are sent to the interface board and monitored and recorded by the computer.

The analog inputs on the interface board monitor analog input signals from the pressure transducer and the load cell. As with the thermocouple, outputs from the pressure transducer and load cell are sent to the portable interface board and the data is recorded by the computer.

A multisource power supply allows the above units to be used in the laboratory. The pressure transducers and load cells require an excitation voltage to operate correctly. To supply the required excitation voltage for these devices, the power supply outputs the required DC voltage needed for those devices, for example, from a power terminal such as 15V DC power terminal 308 described above with reference to FIG. 3.

The input from the sensors in the experiment are used to control various aspects of the reaction. For example, the temperature inputs can be used to monitor and control the heater for the reaction. Software can incorporate a PID loop to automatically adjust the voltage to the heater. This system can heat the reaction to a specified temperature and maintain the desired temperature. Both the power settings and actual temperature can be recorded by the interface board and software.

The software and analog output signal from the interface board can also be used to control the speed of an electric motor for stirring the experiment. This stir rate can also be automatically recorded by the system. Any changes to the stir rate by the operator can then be reproduced in future experiments.

An analog output signal from the interface board can be used to vary a reagent addition pump. A digital output can be also be used to turn a reagent addition pump on or off.

A different channel on the interface board can be used to control a pump to remove reagent from the autoclave. The removed product can be transferred to a vessel on a load cell. This load cell can, in turn, monitor the weight via the interface board and the computer.

The maximum values of pressure, temperature, time, product addition or removal can be set in the software, and the system can be configured to turn off laboratory equipment if the maximum values are exceeded. This can also act as a safety feature to protect the operator.

While the disclosed systems, devices, and methods have been described in conjunction with exemplary embodiments, these embodiments should be viewed as illustrative, not limiting. It should be understood that various modifications, substitutes, or the like are possible within the spirit and scope of the disclosed systems, devices and methods.

What is claimed is:

1. A modular laboratory automation system for use with laboratory devices configured in an experimental setup, the system comprising:
   a controller that is programmed to output initial control signals for controlling the laboratory devices;
   an interface board that receives the initial control signals and outputs voltage control signals based on the initial control signals, the voltage control signals being indicative of operational voltages and/or amperages of the laboratory devices in the experimental setup, the interface board also receiving monitoring signals from sensors in the experimental setup, the monitoring signals being indicative of experimental variables of the experimental setup, and outputting the monitoring signals to the controller; and a portable power supply that includes a plurality of power terminals, each of the power terminals being electrically connectable to at least one of the laboratory devices in the experimental setup, the portable power supply receiving the voltage control signals and outputting power to the laboratory devices through the power terminals, the outputted power being based on the voltage control signals, wherein the controller is programmed to receive the monitoring signals and output the initial control signals based on the monitoring signals such that the controller controls the voltage control signals and the power outputted to the laboratory devices based on the monitoring signals, and wherein the system is configured to be usable with a plurality of experimental setups such that (a) at least one of the power terminals of the portable power supply is electrically connectable to a first kind of laboratory device in a first experimental setup and is electrically connectable to a second kind of laboratory device in a second experimental setup, (b) the interface board is configured to receive a plurality of different kinds of monitoring signals from a plurality of different kinds of sensors, including receiving monitoring signals from a first kind of sensor in the first experimental setup and receiving monitoring signals from a second kind of sensor in the second experimental setup; and (c) the controller controls power outputted to the first kind of laboratory device in the first experimental setup based on the monitoring signals of the first experimental setup, and controls power outputted to the second kind of laboratory device in the second experimental setup based on the monitoring signals of the second experimental setup.

2. The modular laboratory automation system according to claim 1, wherein the controller is a laptop computer configured to run software that processes and records the monitoring signals.

3. The modular laboratory automation system according to claim 2, wherein the software enables an operator to input setpoints of the experimental variables of the experimental setup, and wherein the controller is programmed to output the initial control signals based on one or more of the setpoints.

4. The modular laboratory automation system according to claim 1, wherein the voltage control signals from the interface board include analog and digital signals.

5. The modular laboratory automation system according to claim 1, wherein the interface board includes a plurality of analog or digital input terminals and a plurality of analog or digital output terminals.

6. The modular laboratory automation system according to claim 1, wherein the interface board includes a plurality of thermocouple input terminals.

7. The modular laboratory automation system according to claim 1, wherein the interface board includes input terminals that are configured to receive monitoring signals from thermocouples, pressure transducers, and load cells.

8. The modular laboratory automation system according to claim 1, wherein the portable power supply is electrically connectable to a power source of 120V or 240V line voltage.

9. The modular laboratory automation system according to claim 1, wherein the power terminals are selected from a 120V or 240V power receptacle, a DC power terminal, a DC variable power terminal incorporating operational amplifiers, and a potentiometer terminal configured to incorporate a circuit that replaces a laboratory device potentiometer.

10. The modular laboratory automation system according to claim 1, wherein the portable power supply includes a 120V or 240 V power receptacle and a DC power terminal.

11. The modular laboratory automation system according to claim 10, wherein the DC power terminal outputs 0-16V power.

12. The modular laboratory automation system according to claim 10, wherein the DC power terminal is electrically connectable to at least one laboratory device requiring an excitation voltage.

13. The modular laboratory automation system according to claim 1, wherein the portable power supply includes a DC variable power terminal incorporating operational amplifiers.

14. The modular laboratory automation system according to claim 13, wherein the DC variable power terminal is electrically connectable to at least one laboratory device requiring 0-15V and up to 1 Amp power.

15. The modular laboratory automation system according to claim 1, wherein the portable power supply includes a potentiometer terminal configured to incorporate a circuit that replaces a laboratory device potentiometer.

16. The modular laboratory automation system according to claim 1, wherein the system is configured for use with laboratory devices including laboratory pumps, laboratory heaters, chillers, coolers, valves, and stirrers, and sensors including thermocouples, pressure transducers, load cells, and flow meters.

17. The modular laboratory automation system according to claim 1, wherein the first experimental setup is selected from one of a distillation experimental setup, a pressure reaction experimental setup and a solubility experiment, and the second experimental setup is selected from another one of the distillation experimental setup, the pressure reaction experimental setup and the solubility experiment.

18. The modular laboratory automation system according to claim 1, wherein the controller controls power to the laboratory devices by using a plurality of different kinds of control mechanisms.

19. The modular laboratory automation system according to claim 18, wherein the plurality of different kinds of control mechanisms include PID control, on/off control, setpoint control, percent power control, and timed control.

20. The modular laboratory automation system according to claim 1, wherein the controller, interface board and power supply are sized to have a total volume of less than about one cubic foot.

21. A modular laboratory automation system for use with laboratory devices configured in an experimental setup, the system comprising:

a controller that is programmed to output initial control signals for controlling the laboratory devices;

an interface board that receives the initial control signals and outputs voltage control signals based on the initial control signals, the voltage control signals being indicative of operational voltages and/or amperages of the laboratory devices in the experimental setup, the interface board also receiving monitoring signals from sensors in the experimental setup, the monitoring signals being indicative of experimental variables of the experimental setup and outputting the monitoring signals to the controller; and a portable power supply that has a plurality of power terminals including at least one 120V or 240V power receptacle, and at least one of a DC power terminal, a DC variable power terminal incorporating operational amplifiers, and a potentiometer terminal configured to incorporate a circuit that replaces a laboratory device potentiometer, each power terminal being electrically connectable to at least one of the laboratory devices in the experimental setup, the power supply receiving the voltage control signals and outputting power to the laboratory devices through the power terminals, the outputted power being based on the voltage control signals, wherein the controller is programmed to receive the monitoring signals and output the initial control signals based on the monitoring signals such that the controller controls the voltage control signals and the power outputted to the laboratory devices based on the monitoring signals, and wherein the system is configured to be usable with a plurality of experimental setups such that (a) at least one of the power terminals of the portable power supply is electrically connectable to a first kind of laboratory device in a first experimental setup and is electrically connectable to a second kind of laboratory device in a second experimental setup, (b) the interface board is configured to receive a plurality of different kinds of monitoring signals from a plurality of different kinds of sensors, including receiving monitoring signals from a first kind of sensor in the first experimental setup and receiving monitoring signals from a second kind of sensor in the second experimental setup; and (c) the controller controls power outputted to the first kind of laboratory device in the first experimental setup based on the monitoring signals of the first experimental setup, and controls power outputted to the second kind of laboratory device in the second experimental setup based on the monitoring signals of the second experimental setup.

* * * * *